United States Patent
Gabbianelli et al.

(10) Patent No.: US 6,926,350 B2
(45) Date of Patent: Aug. 9, 2005

(54) HYDROFORMED SPACE FRAME AND REARWARD RING ASSEMBLY THEREFOR

(75) Inventors: Gianfranco Gabbianelli, Troy, MI (US); Richard D. Ashley, Gaylord, MI (US)

(73) Assignee: Cosma International Inc., Concord (CA)

(*) Notice: Subject to any disclaimer, the term of this patent is extended or adjusted under 35 U.S.C. 154(b) by 0 days.

(21) Appl. No.: 10/416,549

(22) PCT Filed: Nov. 9, 2001

(86) PCT No.: PCT/US01/43043
§ 371 (c)(1),
(2), (4) Date: Oct. 17, 2003

(87) PCT Pub. No.: WO02/38434
PCT Pub. Date: May 16, 2002

(65) Prior Publication Data
US 2004/0051345 A1 Mar. 18, 2004

Related U.S. Application Data

(60) Provisional application No. 60/247,045, filed on Nov. 13, 2000.

(51) Int. Cl.[7] ................................................ B60J 9/00
(52) U.S. Cl. ........................... 296/203.01; 296/187.11; 296/193.08
(58) Field of Search .............................. 296/29, 146.05, 296/146.08, 187.01, 187.03, 187.11, 193.01, 193.08, 203.01, 203.04

(56) References Cited

U.S. PATENT DOCUMENTS

| | | | |
|---|---|---|---|
| 5,209,541 A | * | 5/1993 | Janotik .......................... 296/29 |
| 5,848,853 A | * | 12/1998 | Clenet .......................... 403/272 |
| 6,015,182 A | * | 1/2000 | Weissert et al. .......... 296/146.6 |
| 6,053,562 A | * | 4/2000 | Bednarski ................ 296/146.5 |
| 6,092,865 A | | 7/2000 | Jaekel et al. |
| 6,099,039 A | | 8/2000 | Hine |
| 6,508,035 B1 | * | 1/2003 | Seksaria et al. .............. 49/502 |
| 6,533,348 B1 | * | 3/2003 | Jaekel et al. ................ 296/205 |
| 2004/0051345 A1 | * | 3/2004 | Gabbianelli et al. ... 296/203.01 |

FOREIGN PATENT DOCUMENTS

| | | |
|---|---|---|
| EP | 0 823 363 A2 | 2/1998 |
| EP | 0 823 363 A3 | 12/1999 |
| GB | 2 131 361 A | 6/1984 |

* cited by examiner

*Primary Examiner*—Patricia L. Engle
(74) *Attorney, Agent, or Firm*—Pillsbury Winthrop Shaw Pittman LLP

(57) ABSTRACT

A space frame for a motor vehicle having a pair of laterally spaced, longitudinally extending side rail structures, a pair of forward-most upright structures each being connected to a respective side rail structure, thereby forming a pair of A pillars, a pair of roof rail structures, a forward end of each roof rail structure being connected to an upper end of an associated A pillar, and a rearward ring assembly connected at upper portions thereof with the roof rail structures and at bottom portions thereof with the side rail structures. The rearward ring assembly having (a) a tubular hydroformed inverted U-shaped upper member having a cross portion and a pair of leg portions extending downwardly from opposite ends of the cross portion, (b) a pair of tubular hydroformed side members, and (c) a cross structure rigidly connected in ring-forming relation between the second ends of the side members.

16 Claims, 10 Drawing Sheets

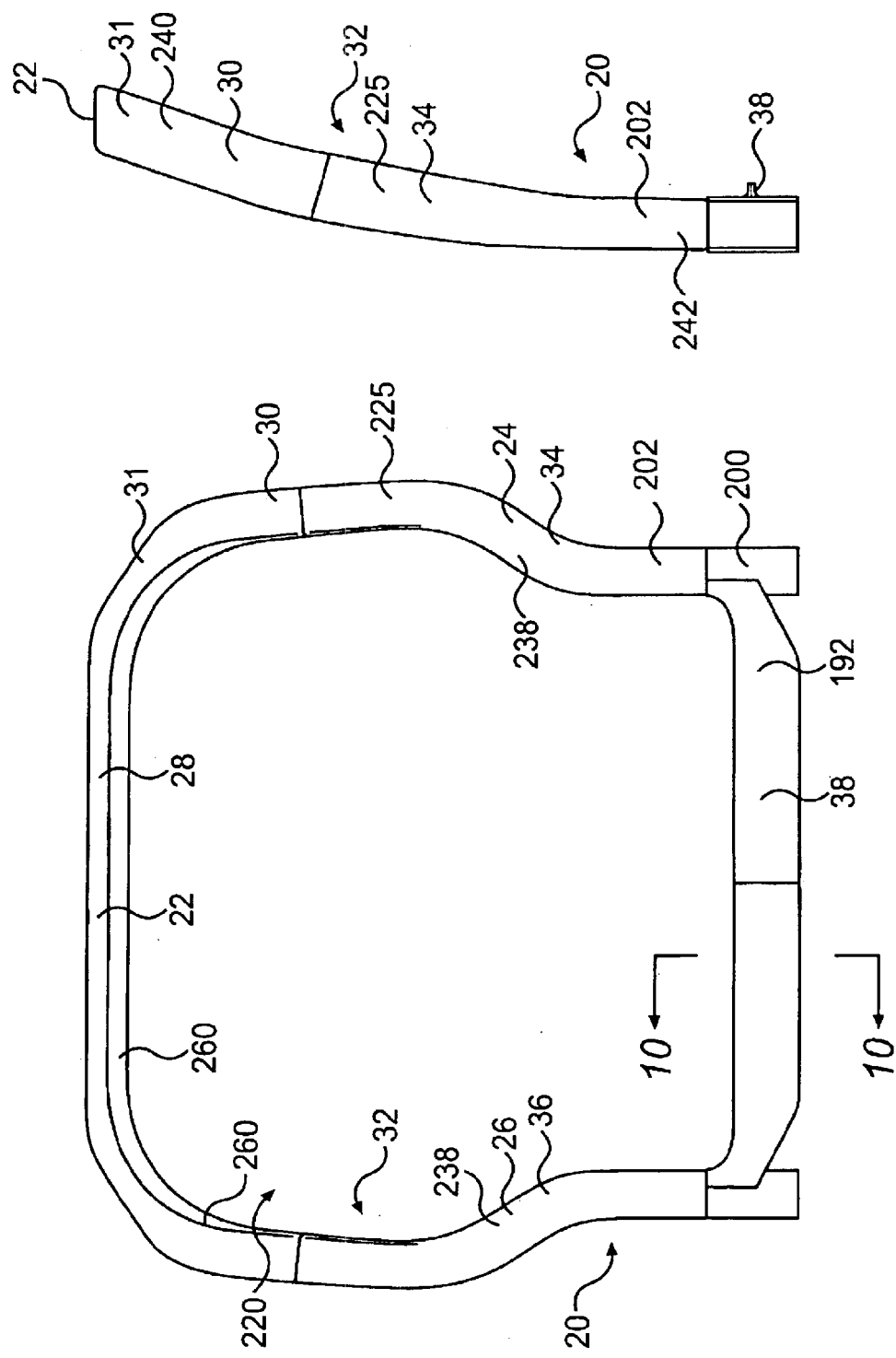

… … …

HYDROFORMED SPACE FRAME AND REARWARD RING ASSEMBLY THEREFOR

This application is the National Phase of International Application PCT/US01/43043 filed 9 Nov. 2001 which designated the U.S. and that International Application was published under PCT Article 21(2) in English on May 16, 2002 as International Publication Number WO 02/38434 A2. This application also claims priority to U.S. Provisional Application No. 60/247,045, filed 13 Nov. 2000, which document is herein incorporated by reference.

FIELD OF THE INVENTION

The present invention is generally related to motor vehicle frames and more particularly to space frames that utilize tubular hydroformed members.

BACKGROUND OF THE INVENTION

Space frame architecture is increasingly being used in vehicle manufacturing and represents a relatively new approach to vehicle construction. A space frame is an assembly of individual frame components that are connected at joints to form a cage-like structure on which the other vehicle components, such as the engine, the drive train, the suspension and the hang-on vehicle body parts, are mounted. The hang-on vehicle body parts may include the floor pan, roof, fenders, doors, body panels, hood and trunk lid.

Individual space frame components can be of hydroformed construction. Tubular hydroforming offers many advantages in space frame construction because it allows vehicle manufacturers to better control frame stiffness, dimensional accuracy, fatigue life, and crashworthiness over prior vehicle construction methods while reducing frame mass and cost. Non-hydroformed vehicle frame construction typically utilizes individual frame components that are formed, for example, by roll forming or by forming several metallic structures by stamping and then welding them together. Hydroforming is a metal-forming process in which high pressure fluid is used to outwardly expand a tubular blank into conformity with surfaces of a die cavity of a die assembly to form an irregularly shaped tubular part. Individual hydroformed members can be provided with a wider range of complex longitudinal curvatures and transverse cross sectional shapes in comparison with stamped or roll formed parts. Each hydroformed member can have a transverse cross-sectional configuration that varies continuously along its length, to the configuration desired.

Hydroformed parts are also advantageous because they have a higher strength than stamped parts, partly because of their tubular (i.e., closed cross sectional) construction and partly because the outward expansion of the wall of the blank during hydroforming caused by the fluid pressure creates a work-hardening effect which uniformly hardens the metallic material of the resulting individual hydroformed member. Hydroforming also produces less waste metal material than stamping.

Sheet metal panels (forming exterior surface portions of, for example, the fenders, the hood, the roof and the hatchback or trunk) and glass panels (such as, for example, the front and rear windshields and the side windows) mounted on the space frame comprise most of the exterior of the vehicle. In recent years consumers have preferred vehicles having curved exterior surfaces and rounded corners and edges.

Although many consumers prefer vehicles having these curved and rounded exterior surfaces for aesthetic reasons, these body types offer many functional advantages beyond the improved aesthetics. Vehicles having curved and rounded exterior surfaces, for example, have improved aerodynamic properties. Improved aerodynamics provide many advantages, including improved fuel efficiency and improved vehicle handling, particularly at high speeds. Curved and rounded vehicle exterior surfaces (including both glass and metal surfaces) are generally convex and therefore scatter reflected light more efficiently than flat exterior surfaces, thereby improving driver visibility in direct sunlight. It is particularly desirable in this regard that the exterior surface on the back of the vehicle be rounded to avoid reflecting a large quantity of bright sunlight toward drivers in other vehicles.

For a vehicle body to have a curved exterior surface, portions of the space frame which support the metallic and glass body panels must often have a similar curvature. Although tubular blanks can be hydroformed so that the transverse cross-sectional geometry and the longitudinal shape (for example, the longitudinal curvature) of the finally-formed hydroformed member varies greatly, some space frame components must have a very complex geometry which cannot easily be achieved by using a component comprised of a hydroformed member formed from a single tubular blank.

There are several reasons for the practical limitations on the complexity of the geometry of an individual hydroformed member. During hydroforming, a tubular metallic blank is usually expanded radially outwardly along its length and is pushed axially inwardly at each end during this outward expansion to control the wall thickness, thereby preventing the localized wall thinning that would otherwise occur during outward expansion. This axial pressure exerted on the ends of the blank causes portions of the outer surface of the tubular blank to slide in an axial direction with respect to the die cavity surface. The greater the degree of outward expansion of the blank into conformity with the die surface and the greater the radially directed outward pressure (caused by the internal fluid pressure), the greater the surface-to-surface frictional force between the cavity and the blank. A lubricant is often applied to the outer surface of the blank prior to placement of the blank in the die cavity of the die assembly to facilitate axial movement of the metallic wall of the blank with respect to the surface defining the die cavity during outward expansion. If required by the geometry of the hydroformed member, the tubular blank may be pre-bent at selected locations along its length prior to placement into the die cavity. The more complex the geometry of the blank due to pre-bending and the longer the length of the tubular blank, the more difficult it is to achieve axial flow of the metallic material of the tubular blank during outward expansion. Consequently, some complex individual tubular hydroformed space frame member geometric configurations cannot be achieved with commercially available hydroforming technology, and other complex tubular hydroformed space frame geometric configurations cannot be achieved in a cost effective and commercially feasible manner starting from a single tubular metallic blank. Therefore there may be a need to form some space frame components having complex geometric configurations by hydroforming a plurality of individual hydroformed members and then connecting them together.

A rearward opening in a space frame for a sports utility-type vehicle (or a rearward opening of other types of vehicles such as a station wagons or vehicles having a hatchback-type opening) may be provided by a closed loop or ring-like structure. A suitable ring-like structure must often have a complex geometry to provide suitably shaped support structure for curved and rounded vehicle body sheet metal and glass panels while providing an opening having a desired configuration. It is particularly important, for example, that the rear opening defined by the rear ring-like structure provide optimal driver field of vision when a driver looks into his or her central rear view mirror. There is a need in the vehicle manufacturing industries for a rear ring-like structure provided by a rearward ring assembly of tubular hydroformed construction that can provide the complex geometry required for contemporary vehicles.

SUMMARY OF THE INVENTION

To meet the needs identified above, the invention provides a space frame for a motor vehicle comprising a pair of laterally spaced, longitudinally extending side rail structures, a pair of forward-most upright structures and a pair of roof rail structures. Each forward-most upright structure is connected to a respective side rail structure, thereby forming a pair of A pillars and a forward end of each roof rail structure is connected to an upper end of an associated A pillar. A rearward ring assembly is connected at upper portions thereof with the roof rail structures and at bottom portions thereof with the side rail structures. The rearward ring assembly includes a tubular hydroformed inverted U-shaped upper member, a pair of tubular hydroformed side members and a cross structure. The tubular hydroformed upper member has a cross portion and a pair of leg portions extending downwardly from opposite ends of the cross portion. Each side member has a first end and a second end and the first end of each side member is connected with a free end of a respective leg portion of the upper member. The cross structure is rigidly connected in ring-forming relation between the second ends of the side members. The side rail structures, the A pillars, the roof rail structures and the rearward ring assembly generally defining a space frame interior region and the rearward ring assembly provides a rearward opening into the interior region. The side members have lower portions thereof disposed closer to one another than the upper portions thereof, the side members have lower portions thereof disposed more rearwardly in a longitudinal frame direction in relation to the upper portions thereof.

Other objects, features, and advantages of the present invention will become apparent from the following detailed description, the accompanying drawings, and the appended claims.

BRIEF DESCRIPTION OF THE DRAWINGS

FIG. 7 shows a rear elevational view of the rearward ring assembly in isolation;

FIG. 8 shows a side elevational view of the rearward ring assembly in isolation;

DETAILED DESCRIPTION OF THE PREFERRED EMBODIMENT OF THE INVENTION

Figure 1:
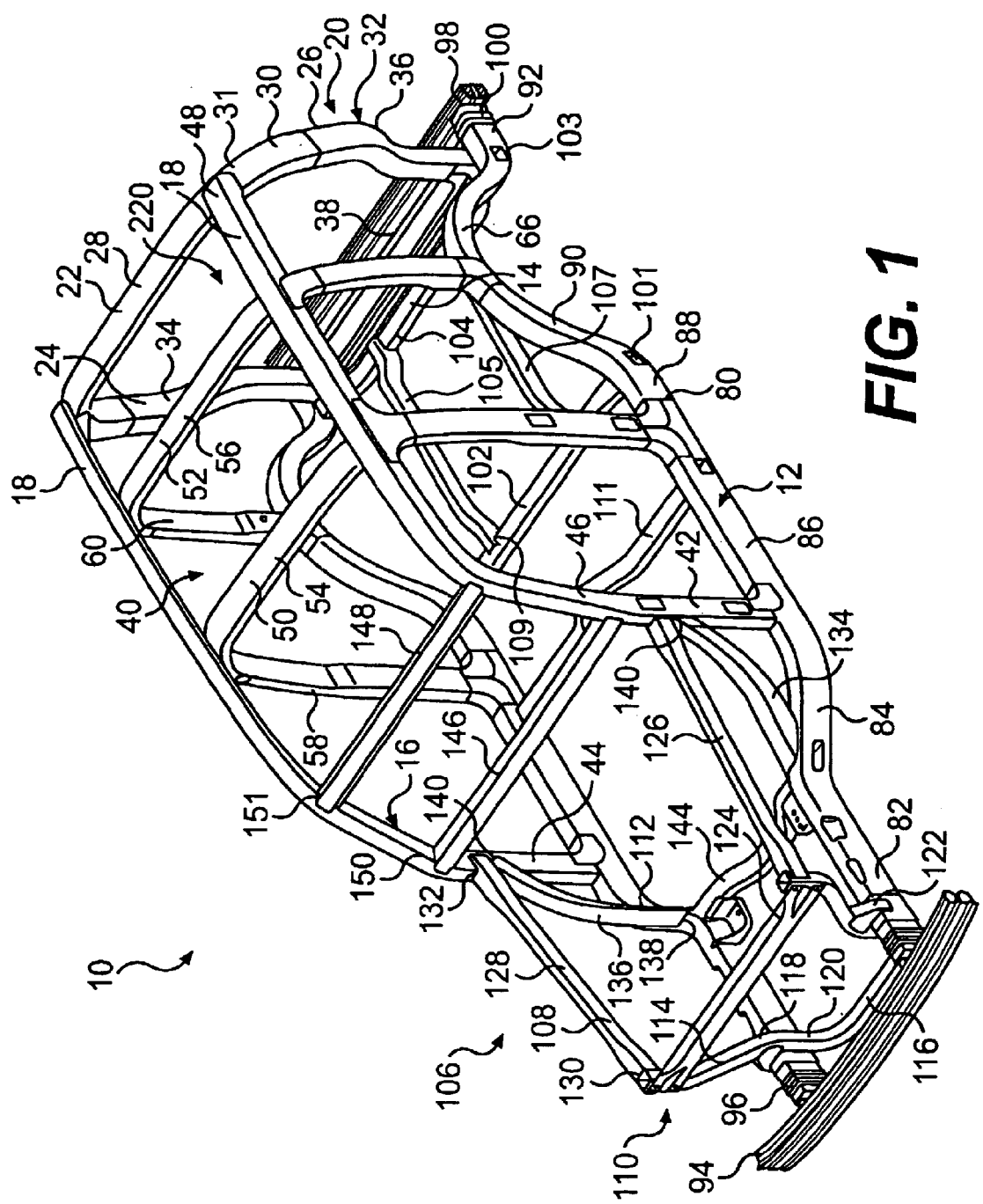
FIG. 1 shows a perspective view of a motor vehicle space frame that is constructed according to the principles of the invention and that includes a rearward ring assembly constructed according to the principles of the present invention.

FIG. 1 shows a space frame, generally designated 10, constructed according to the principles of the present invention. The space frame 10 generally includes a pair of laterally spaced, longitudinally extending side rail structures 12, a laterally extending rearward connecting structure 14 connected between rearward portions of the side rail structures 12 and a pair of forward-most upright structures 16. Each forward-most upright structure 16 is connected to a respective side rail structure 12 and extends generally upwardly therefrom to form a pair of A pillars. A pair of roof rail structures 18 are disposed on each side of the space frame 10 in generally vertically spaced relation above the side rail structures 12 and are connected to the space frame 10 in a manner described below.

The space frame 10 includes a rearward ring assembly 20. The rearward ring assembly 20 is shown in isolation in FIGS. 5–9 and is described in detail below. It can be appreciated from FIG. 1 that the rearward ring assembly 20 includes a tubular hydroformed inverted U-shaped upper member 22 and a pair of tubular hydroformed side members 24, 26. The side members 24, 26 are preferably of mirror image construction so only member 24 will be discussed in detail, but the discussion applies equally to member 26. Generally, in the present application, when a pair of structures or members are identified as being of mirror image construction, only one structure or member is discussed in detail, but the discussion applies to both. The upper member 22 is an integral structure having a cross portion 28 and a pair of legs 30 extending downwardly from junctures 31 at opposite ends of the cross portion 28.

The pair of tubular hydroformed side members 24, 26 are each connected at a first end thereof with a free end of a respective leg 30 of the upper member 22. The cross portion 28 of the upper member 22 and the pairs of connected legs and side members, 30, 24 and 30, 26, respectively, thereby define a cross portion and pair of leg portions, respectively, of a tubular hydroformed inverted generally U-shaped assembly 32. The cross portion of the U-shaped assembly 32 is identical to the cross portion 28 of the upper member 22 and will therefore be referred to by the same reference numeral. The leg portions of the U-shaped assembly 32 are designated 34 and 36 to facilitate discussion of the invention. Cross structure, generally designated 38, is rigidly connected in ring-forming relation between the second ends of the side members 24, 26 in a manner best seen in FIGS. 5–7. The structure of the rearward ring assembly 20 in considered in detail below.

The manner in which the assembled rearward ring assembly 20 is connected to the space frame 10 can be understood from FIG. 1. The cross structure assembly 38 is connected to the rearward connecting structure 14 such that the cross structure assembly 38 extends laterally between the side rail structures 12 and each leg portion 34, 36 of the U-shaped assembly 32 is connected to an associated side rail structure 12 and extends generally upwardly with respect thereto, thereby forming a pair of rearward-most or "D" pillars 34, 36. Each roof rail structure 18 is connected between an upper end of a respective A pillar 16 and an associated juncture 31 of the rearward ring assembly 20. The side rail structures 12, the A pillars 16, the roof rail structures 18 and the rearward ring assembly 20 generally define a space frame interior region 40 and the rearward ring assembly 20 provides a rearward opening into the interior region 40.

Before the rearward ring assembly 20 is considered in detail, the construction of the space frame 10 will be considered. The space frame 10 includes a pair of tubular hydroformed upper longitudinal members 42, 44 which are mounted on respective side rail structures 12. Each hydroformed member is defined by an outwardly deformed tubular metallic wall fixed into a predetermined surface configuration. The upper longitudinal members 42, 44 are preferably of mirror image construction. Each upper longitudinal member 42 has a pillar-forming portion 46 and an integral longitudinally extending portion 48. The pillar-forming portion 46 of each upper longitudinal member 42 is connected to a respective side rail structure 12 and extends upwardly therefrom to provide one A-pillar 16 of the pair of A-pillars 16. The longitudinally extending portion 48 of the upper longitudinal member 42 extends rearwardly from the pillar-forming portion 46 and a free end the longitudinally extending portion 48 is connected to an associated juncture 31 of the rearward ring assembly 20. The longitudinally extending portions 48 of the upper longitudinal members 42, 44 define the pair of roof rail structures 18.

The longitudinally extending portion 48 of each upper longitudinal member 42 also defines a longitudinal length between the forward-most or A pillar and the associated rearward-most or D pillars 34, 36 (defined by the leg portions 34, 36 of the tubular hydroformed U-shaped assembly 32 of the rearward ring assembly 20, as will become clear) on each side of the space frame 10. The longitudinal length define by each integral hydroformed longitudinally extending portion 48 minimizes the stacked tolerances between the forward-most 16 and rearward-most pillars 34, 36 as taught and described in detail in commonly assigned U.S. patent application Ser. No. 09/173,554 entitled HYDROFORMED SPACE FRAME AND METHOD OF MANUFACTURING THE SAME hereby incorporated by reference in its entirety into the present application for all material disclosed therein.

A pair of first and second hydroformed inverted U-shaped members 50, 52 are mounted between the side rail structures 12. Each inverted U-shaped member 50, 52 includes a cross portion 54, 56, respectively, and a pair of leg portions 58, 60, respectively, extending integrally from junctures at opposite ends of the cross portions 54, 56. Each leg portion 58 of the first U-shaped member 50 is connected to a respective side rail structure 12 and extends upwardly therefrom and each juncture thereof is connected to the longitudinally extending portion 48 of an associated upper longitudinal member 42, 44. The leg portions 58 of the first U-shaped member 50 thereby define a pair of B pillars of the space frame 10. Each leg portion 60 of the second U-shaped member 52 is connected to an arched wheel well-forming portion 66 of a respective side rail structure 12 and extends upwardly therefrom and each juncture of the second U-shaped member 52 is connected to the longitudinally extending portion 48 of an associated upper longitudinal member 42, 44. The leg portions 60 of the second U-shaped member 52 thereby define a pair of C pillars of the space frame.

Preferably each side rail structure 12 is comprised of a tubular hydroformed forward side rail member 72, 74, respectively, and a tubular hydroformed rearward side rail member 76, 78, respectively. The forward side rail members 72, 74 are of mirror image construction and the rearward side rail members 76, 78 are of mirror image construction. The forward side rail member 72 has an essentially straight forward portion 82, an outwardly angled intermediate portion 84 and an essentially straight rearward portion 86. The rearward side rail member 76 has a short essentially straight forward portion 88, an upwardly arched intermediate portion 90 (that forms the wheel well 66) and an essentially straight rearward portion 92. The forward and rearward side rail members 72, 76 are preferably telescopically interengaged and welded together to form a joint 80 therebetween.

A front bumper beam assembly 94 is laterally connected across the forward ends of the forward side rail members 72, 74. The forward-most end of each forward side rail member 72, 74 includes an integral hydroformed collapsible forward terminal end portion 96 that is constructed and arranged to collapse in a controlled, energy absorbing manner in the event of a front and collision, thereby absorbing impact energy.

A rear bumper beam assembly 98 is connected across the rearward ends of the rearward side rail members 76, 78. The rearward side rail members 76, 78 include integral hydroformed collapsible rearward terminal end portions 100 that are constructed and which function similarly to the collapsible forward terminal end portions 96.

A pair of connecting structures are connected laterally between the side rail structures 12 forwardly and rearwardly, respectively, of the wheel wells 66. Preferably, the connecting or cross structures are provided by intermediate and rearward tubular hydroformed connecting or cross members 102, 104. Preferably, the rearward tubular hydroformed connecting member 104 comprises the rearward connecting structure 14. For discussion purposes, the hydroformed cross members 102, 104 are also referred to as the intermediate and rearward connecting structures 102, 104. The intermediate and rearward connecting structures 102, 104 are connected laterally between the side rail structures 12 forwardly and rearwardly, respectively, of the wheel wells 66. Specifically, each end of each cross member 102, 104 is secured within pairs of aligned openings 101, 103, respectively, formed in the rearward side rail members 76, 78 and are secured within the openings by welding. A pair of longitudinally extending support structures are each connected between the intermediate and rearward connecting structures 102, 104 and are preferably provided by a pair of tubular hydroformed support members 105, 107. A notch 109 is formed in each end of each support member 105, 107 and the support members 105, 107 are affixed to the space frame 10 by positioning each of the intermediate and rearward connecting structures 102, 104 within a notch 109 and welding the support members 105, 107 to the connecting structures 102, 104.

A central cross structure, preferably provided by a tubular hydroformed central member 111, is connected between the forward side rail members 72, 74. Preferably the central member 111 is connected between the side rail members 72, 74 in a manner similar to the way in which members 102, 104 are connected between the rearward side rail members 76, 78. A central portion of the central member 111 is upwardly arched to accommodate a portion of the drive train (not shown) of the assembled vehicle.

The space frame 10 includes a front structural assembly generally designated 106. The front structural assembly 106 includes a pair of front upper side rail structures 108, a front cross structural assembly 110 and a pair of side support structures 112. The front cross structural assembly 110 is connected laterally between forward end portions of the side rail structures 12. Each front upper side rail structure 108 is connected between the front cross structural assembly 110 and an intermediate portion of a respective A pillar 16 so that the front upper side rail structures 108 are laterally space from one another and are generally vertically spaced above forward portions of the side rail structures 12. Each side support structure 112 is connected at one end to an intermediate portion of a respective A pillar 16 and extends forwardly and downwardly therefrom and is connected at another end opposite the one end to an associated side rail structure 12.

The front cross structural assembly 106 includes a front U-shaped structure that is preferably provided by an integral tubular hydroformed front U-shaped member 114. The U-shaped member 114 has a cross portion 116 and a pair of leg portions 118 that extend upwardly from junctures 120 at each end of the cross portion 116. Preferably each juncture 120 is welded to an associated side rail structure 12. Preferably a bracket structure 122 is mounted in reinforcing relation between each side rail structure 12 and an intermediate portion of an associated leg portion 118 of the U-shaped member 114. Preferably each bracket structure 122 is a metallic structure that has been shaped by stamping or other suitable method and is secured to the space frame 10 by welding.

The front cross structure assembly 110 further includes an elongated essentially straight front upper cross structure that is preferably provided by a tubular hydroformed front upper cross member 124. Opposite end portions of the cross member 124 are flattened and are connected to end portions of leg portions 118 of the U-shaped member 114, preferably by welding.

Preferably the front upper side rail structures 108 are provided by a pair of tubular hydroformed front upper side rail members 126, 128. Each upper side rail member 126, 128 can be secured between the pillar forming portion 46 of a respective upper longitudinal member 42, 44 and the associated leg portion 118 of the U-shaped member 114 by any appropriate means. Preferably a notch 130, 132 is formed in each end of each upper side rail member 126, 128 and each member 126, 128 is secured to space frame 10 by welding.

Preferably each side support structure 112 is provided by a tubular hydroformed side support member 134, 136. The side support members 134, 136 are of mirror image construction so only member 134 will be discussed in detail. The side support member 134 can be secured to space frame 10 by any appropriate means. For example, preferably a notch 138, 140 is cut into each end of the side support member 134 and the member 134 is secured to the space frame 10 by positioning the forward side rail member 72 in the notch 138 and the pillar forming portion 46 of the upper longitudinal member 42 in the notch 140 and welding. The side support members 134, 136 reinforce the frame 10. Specifically the members 134, 136 strengthen the front structure assembly 106 and resist deformation of the front end of the vehicle in the event of a head on collusion.

An elongated forward cross structure that is preferably provided by a tubular hydroformed forward cross member 144 extends laterally between and is secured between the forward side rail members 72, 74. Preferably, the forward cross member 144 is secured between the side rail members 72, 74 in manner similar to the way in which hydroformed connecting members 102, 104 are secured between side rail members 76, 78, although any suitable means can be used.

A pair of forward upper cross structures are secured between the pillar forming portions 46 of the upper longitudinal members 42, 44 and are preferably provided by a pair of tubular hydroformed forward upper cross members 146, 148. Preferably a notch 150, 151 is cut in each end of each forward upper cross member 146, 148, respectively, so that a single wall portion extends outwardly in cantilevered fashion from each end of each cross member 146, 148 and the cross members 146, 148 are secured between the upper longitudinal members 42, 44 by placing the upper longitudinal members within respective notches so that the cantilevered wall portions are in adjacent and overlying relation therewith and then welding.

Figure 2:
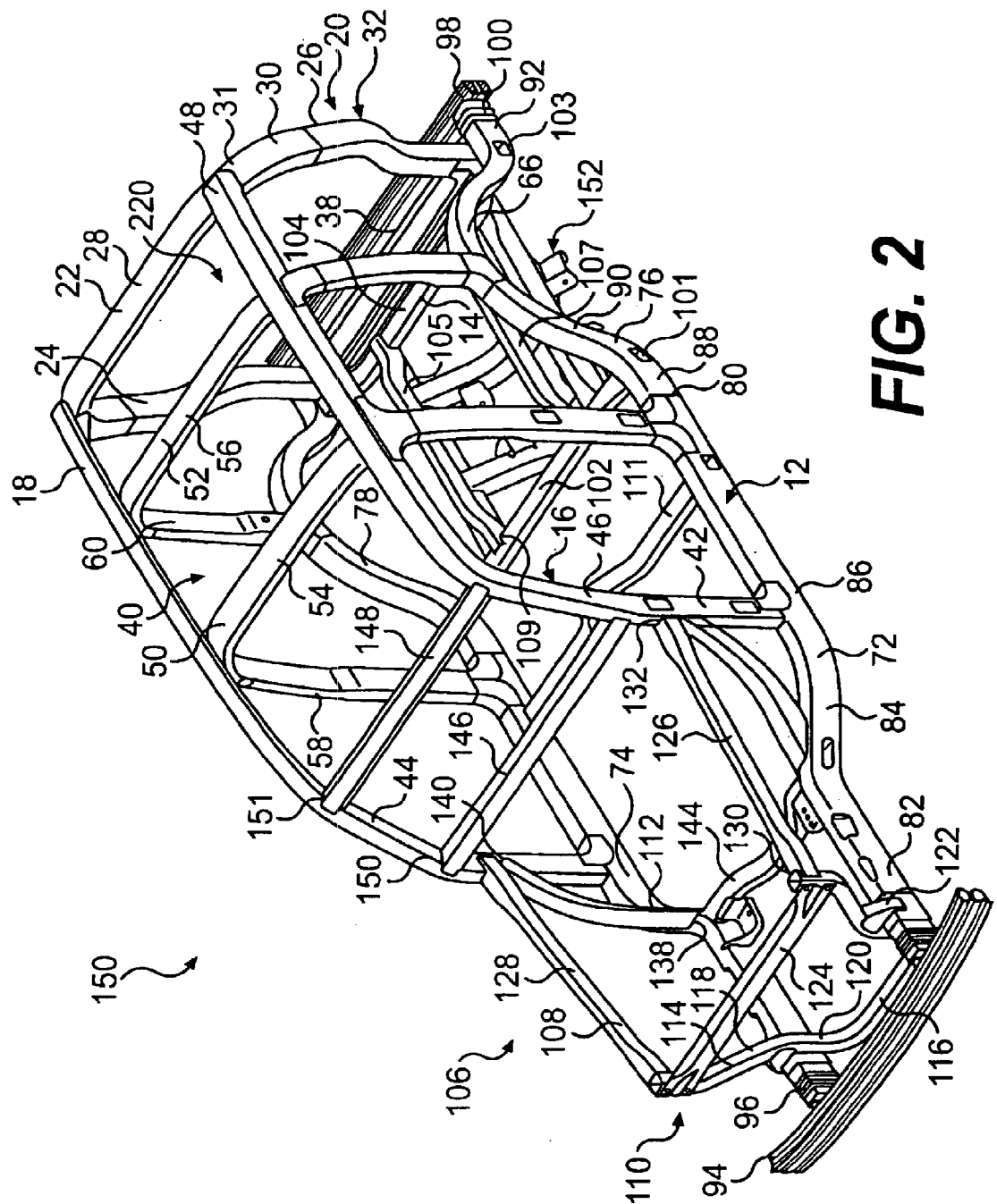
FIG. 2 shows an embodiment of a motor vehicle space frame that includes a cradle assembly constructed according to the principles of the present invention.

FIG. 2 shows a second embodiment of a space frame, generally designated 150. The space frame 150 is identical to the space frame 10 except that the space frame 150 includes a cradle assembly 152. The portions of the space frame 150 that are identical to portions of the space frame 10 are designated by identical reference numbers and are not commented upon the further in the description of the space frame 150.

Figure 3:
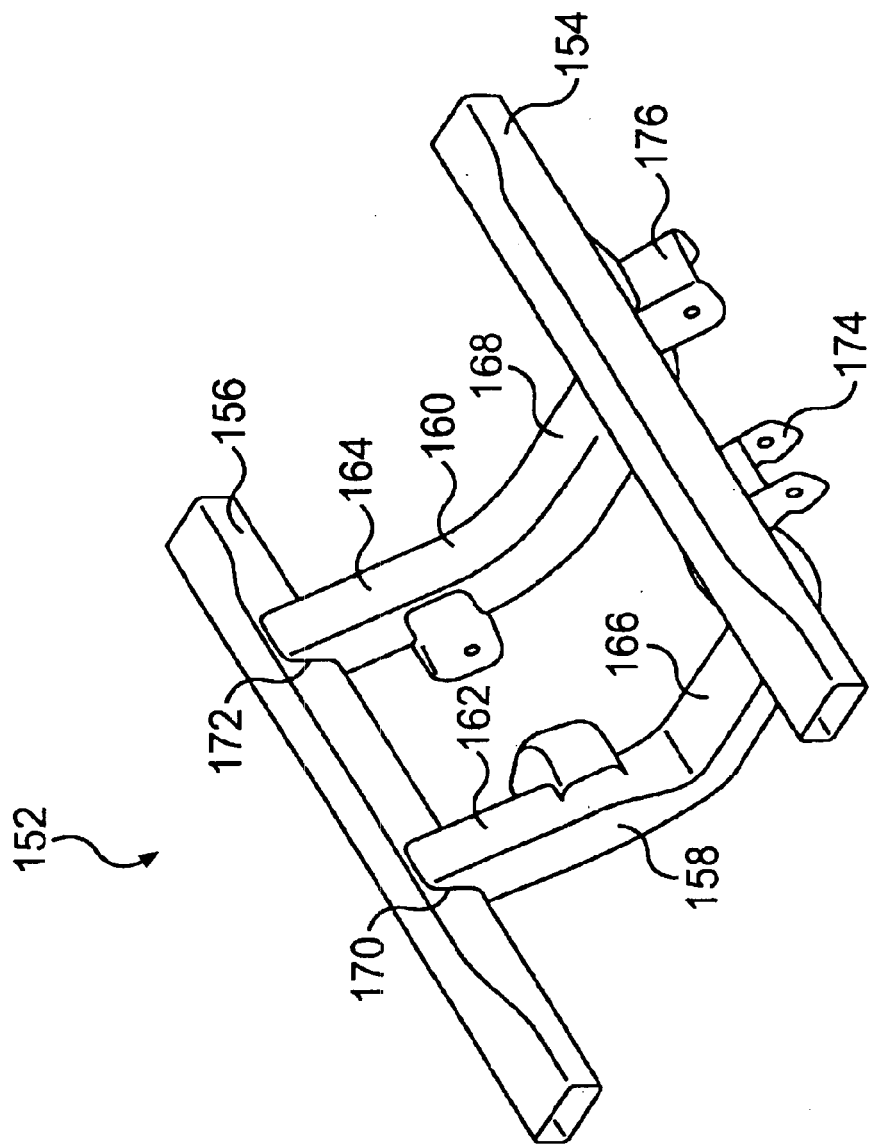
FIG. 3 shows the cradle assembly in isolation.

The cradle assembly 152 is shown in FIG. 2 mounted to the space frame 150 and is shown in FIG. 3 in isolation. As best appreciated from FIG. 3, the cradle assembly 152 includes a pair of elongated cradle support structures that are preferably provided by a pair of elongated tubular hydroformed cradle support members 154, 156 (of mirror image construction). The cradle assembly 152 further includes a pair of U-shaped cradle structures which are preferably provided by a pair of tubular hydroformed U-shaped cradle members 158, 160. Each U-shaped cradle member 158, 160 has a pair of leg portions 162, 164, respectively, extending from an integral cross portion 166, 168, respectively. Preferably notches 170, 172 are formed in each leg portion 162, 164, respectively, of the U-shaped cradle members 158, 160. The cradle support members 154, 156 are secured to the U-shaped cradle members 158, 160 by positioning the cradle support members 154, 156 within the notches 170, 172 and then welding. The cradle assembly 152 is used to mount a rear wheel assembly (which is not shown and which includes a rear wheel suspension system) to the space frame 10 when the vehicle is assembled. A plurality of brackets 174, 176 are secured to the U-shaped cradle members 158, 160 to facilitate attachment of the rear wheel assembly to the vehicle.

Figure 4:
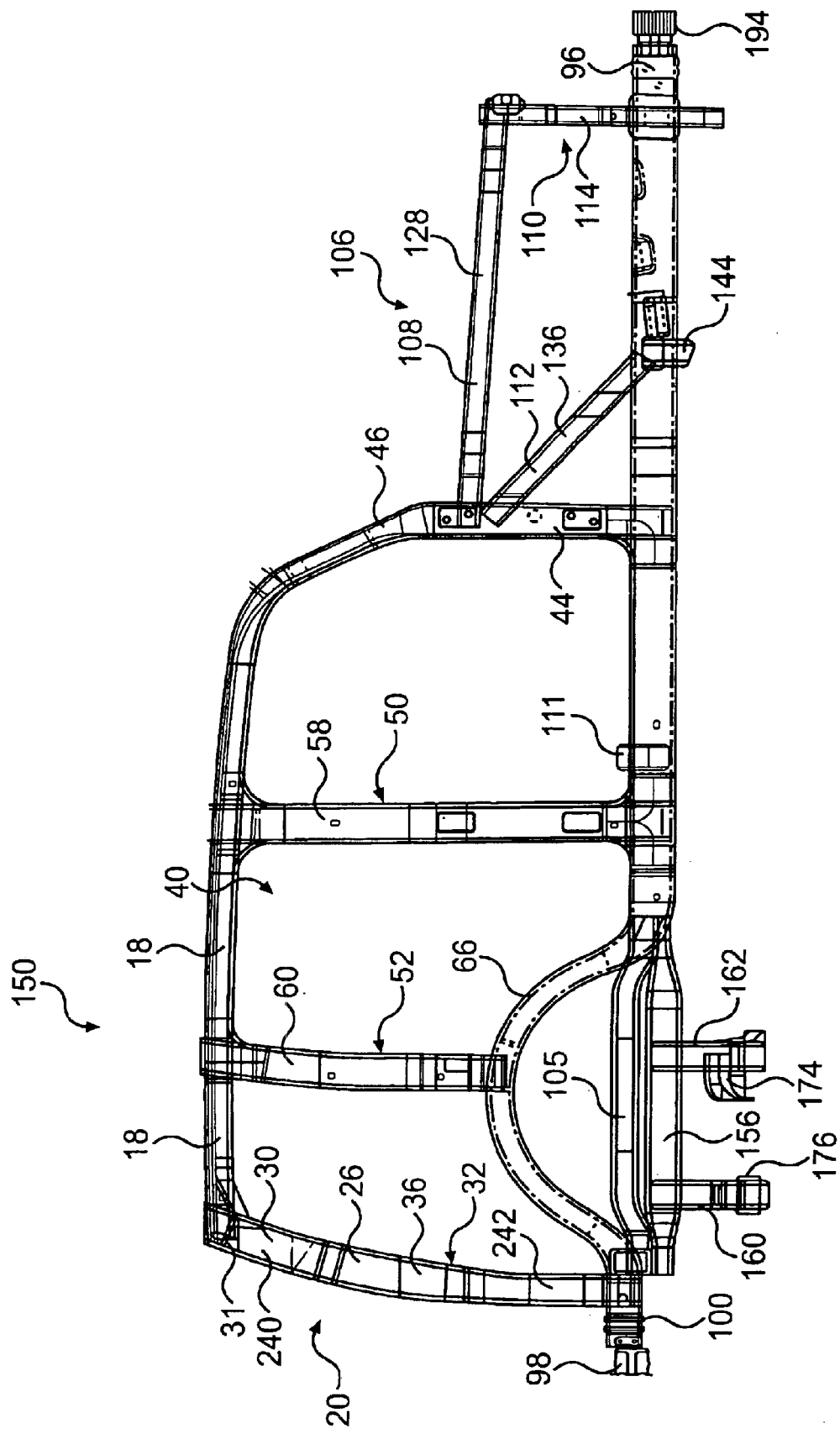
FIG. 4 shows the space frame of FIG. 2 in side elevation view.

The manner in which the cradle assembly 152 is secured to the space frame 150 can be appreciated from FIGS. 2 and 4. The cradle support structures (provided by the cradle support members 154, 156 in the exemplary embodiment of the space frame 150) are laterally spaced and each is connected between the intermediate and rearward connecting structures 102, 104. More particularly, as best seen in FIG. 4, each end portion of each cradle support member 154, 156 is secured to a bottom surface portion of a respective connecting member 102, 104. The cradle support members 154, 156 can be secured to the connecting members 102, 104 by welding, by bolts, or by any other suitable means. The U-shaped cradle structures (provided by the cradle members 158, 160) are longitudinally spaced and, as mentioned, each leg portion 162, 164 of the pair of leg portions of each U-shaped cradle structure 158, 160, respectively, is connected to a respective one of the pair of cradle support structures 154, 156.

It can be understood from FIG. 4 that when a rear wheel assembly is secured to the cradle assembly 152, each rear wheel (not shown) of the assembled vehicle is disposed generally below a respective wheel well 66. Preferably the cradle assembly 152 is provided to facilitate mounting of a rear wheel assembly to the space frame. It is within the scope of the invention to provide an appropriately constructed cradle assembly to facilitate mounting of a front wheel assembly.

Figure 5:
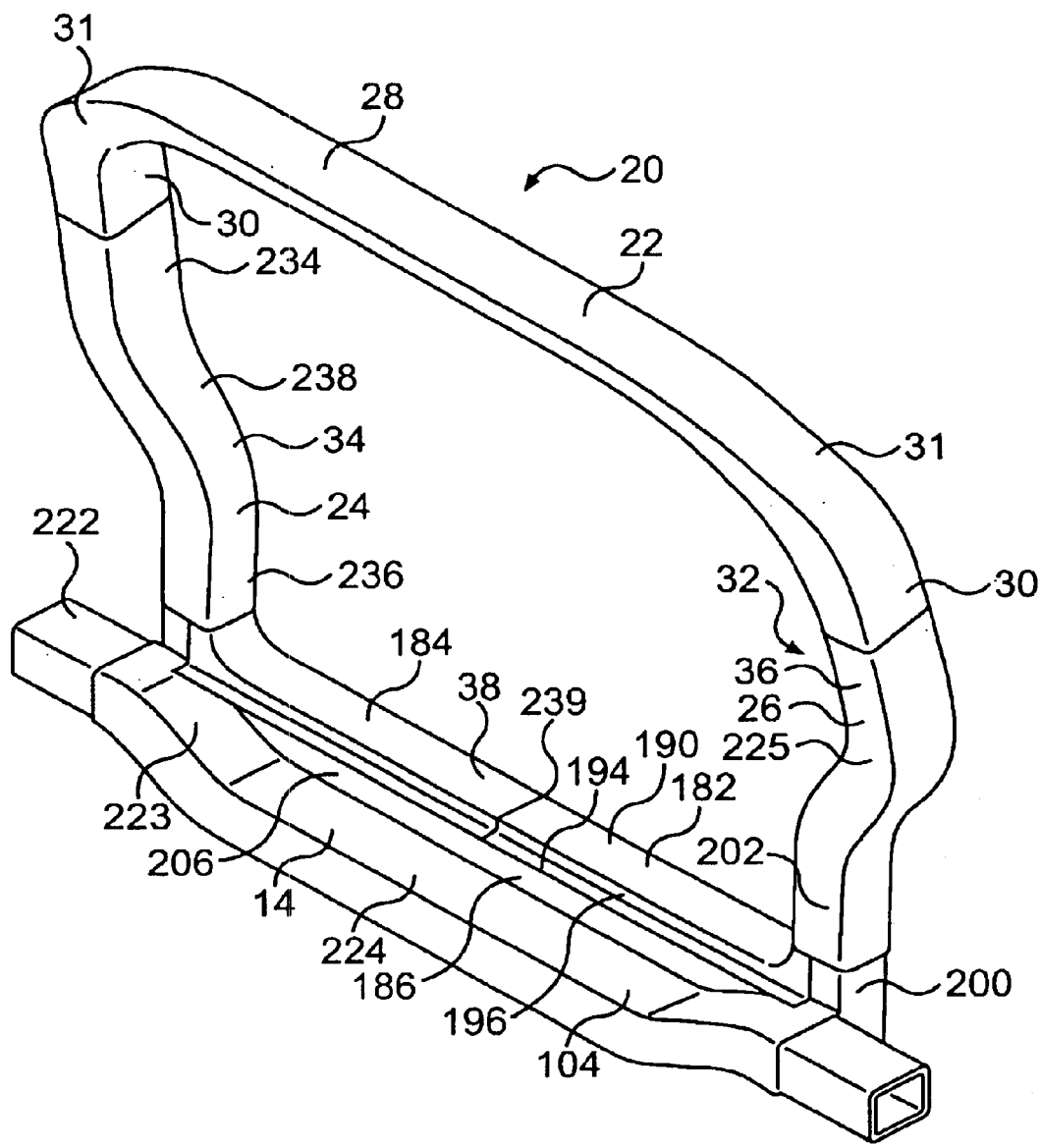
FIG. 5 shows a perspective view of the rearward ring assembly and a hydroformed cross member in isolation.
Figure 6:
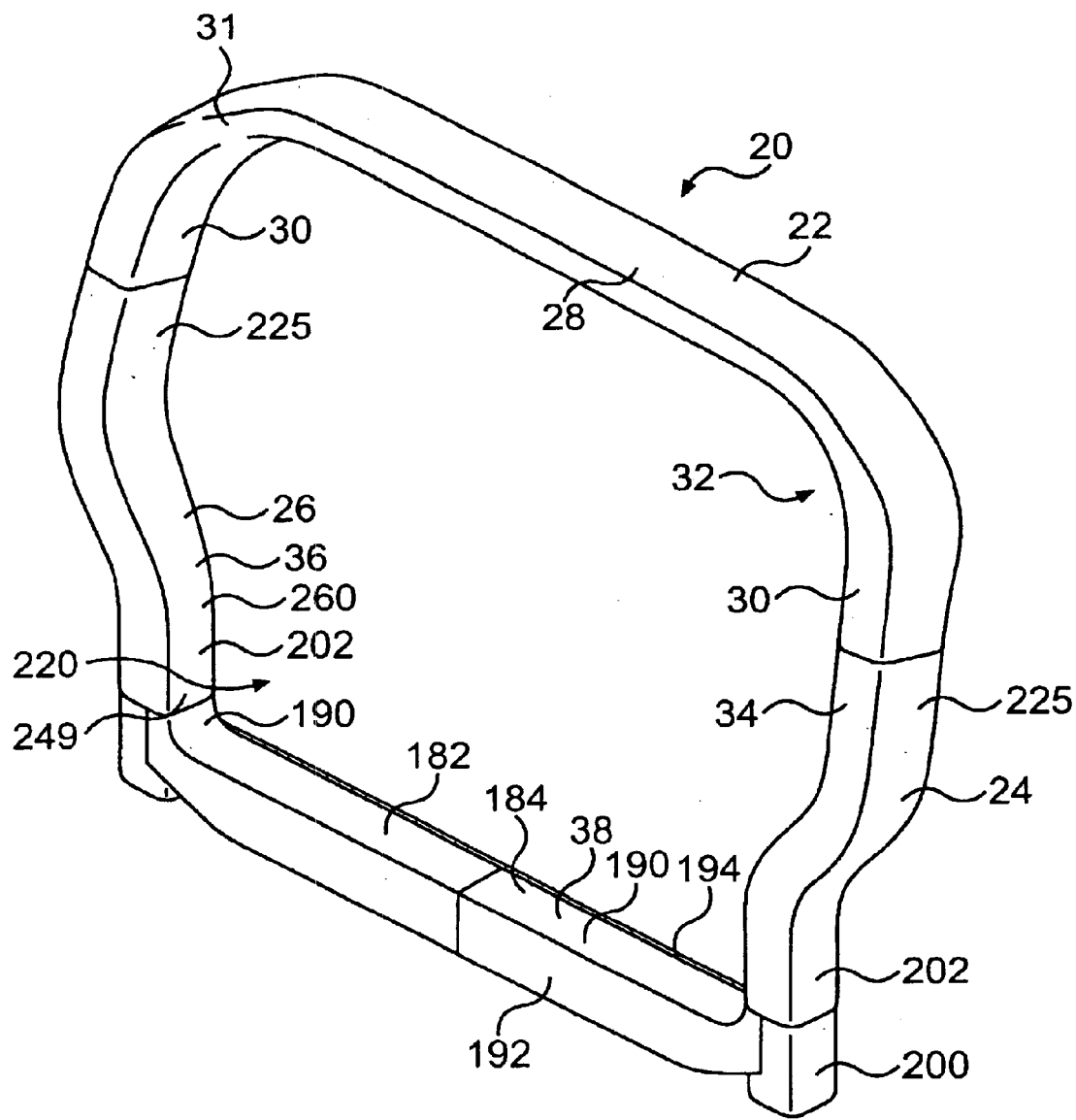
FIG. 6 shows a perspective view of the rearward ring assembly in isolation.

The rearward ring assembly 20 is shown in isolation in FIGS. 6 and 8 and is shown in isolation mounted with respect to the rearward connecting structure 14 in FIG. 5. The construction of the reward ring assembly 20 can be best understood from the exploded view of FIG. 9. As mentioned above, because the tubular hydroformed side members 24, 26 are of mirror image construction, only the member 24 will be discussed in detail. Preferably, an upper terminal end 180 of the side member 24 is of reduced diameter so that the side member 24 can be telescopically received within an end portion of the associated tubular leg portion 30 of the hydroformed upper member 22. Preferably the telescopically interengaged hydroformed members 22, 24 are secured together by welding. It can be appreciated, however, that the hydroformed members 22, 24 can be rigidly affixed together by any suitable means.

The cross structure 38 is preferably comprised of an assembly of metallic structures that have been shaped by stamping, although any suitable metal shaping or metal forming means can be used to construct the metallic structures of the cross structure 38. The cross structure 38 comprises an assembly of stamped members assembled into a tubular configuration. The construction of the cross structure assembly 38 can be best understood from the exploded view of FIG. 9 and the cross sectional view of FIG. 10.

Figure 9:
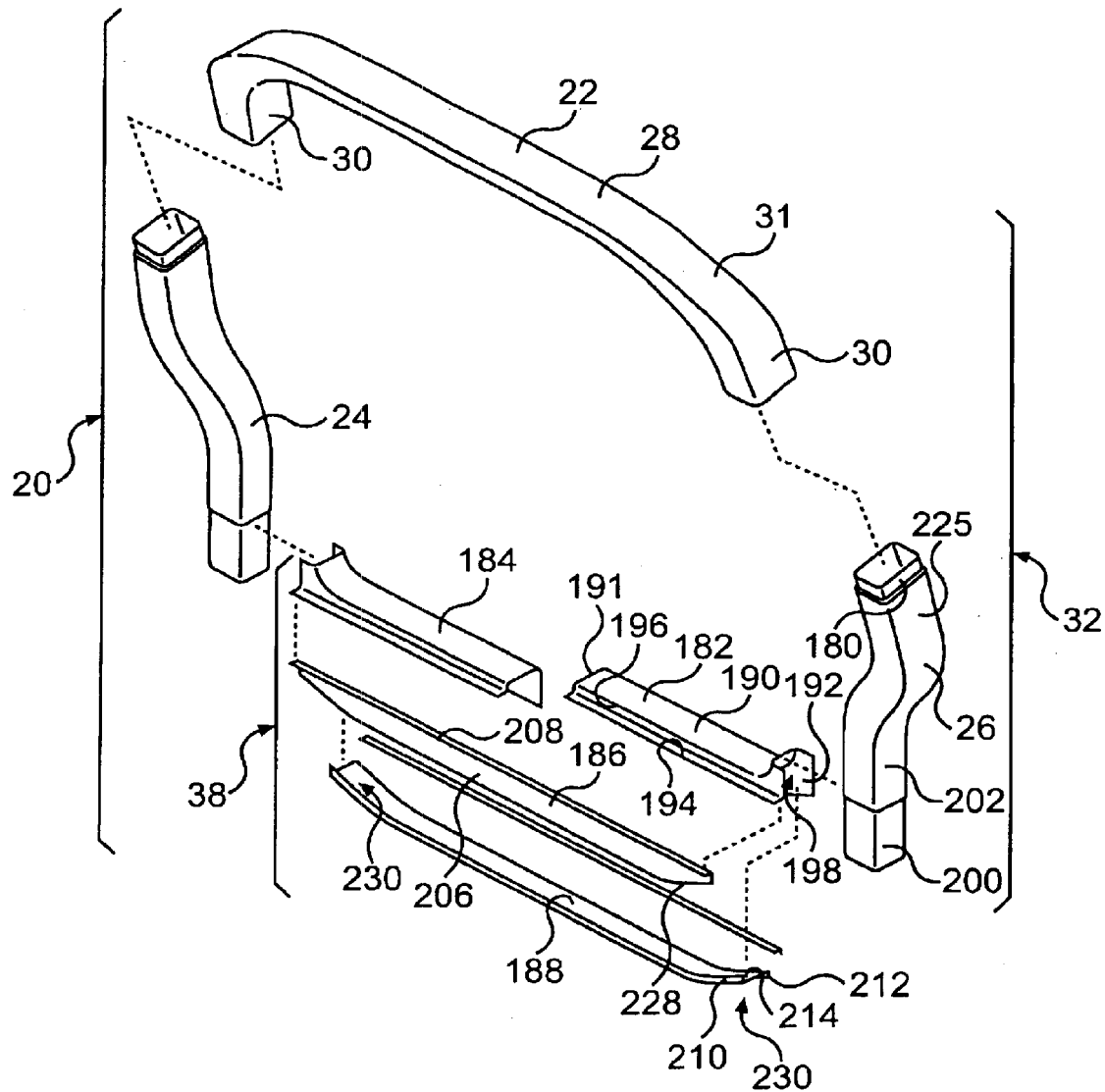
FIG. 9 shows and exploded view of the rearward ring assembly.

More particularly, the cross structure assembly 38 includes a pair of upper cross elements 182, 184, an intermediate cross element 186 and a lower cross element 188. Preferably each cross element 182, 184, 186, 188 is of one-piece stamped sheet metal construction, although any suitable metal shaping or metal forming method can be used to construct each element. As best seen in FIG. 9, preferably the upper cross elements 182, 184 are of mirror image construction (so only element 182 will be discussed in detail).

The cross element 182 is shaped to define integrally an upwardly facing surface 190 (defined by a central wall portion 191), an essentially vertically extending rearward wall portion 192 and a forwardly extending flange portion 194 that extends perpendicularly forwardly from an essentially vertically extending forward wall portion 196. A recessed area 198 that is constructed and arranged to receive a lower terminal end 200 of the side member 24 is generally defined by the forward, central and rearward wall portions 196, 191 and 192 of the cross element 182. The lower end portion 200 of the side member 24 is of reduced diameter so that when the lower portion 200 of the side member 24 is disposed within the recessed area 198 of the cross element 182, the outwardly facing surfaces defined by the wall portions 196, 191, 192 of the cross element 182 are essentially flush with respective adjacent wall surfaces defined by a lower intermediate portion 202 of the side member 24. Preferably, therefore, the wall thickness of the sheet metal used to form the cross element 182 is approximately equal to the depth of the recessed end portion 200 of the side member 24 relative to the lower intermediate portion 202 thereof.

Figure 10:
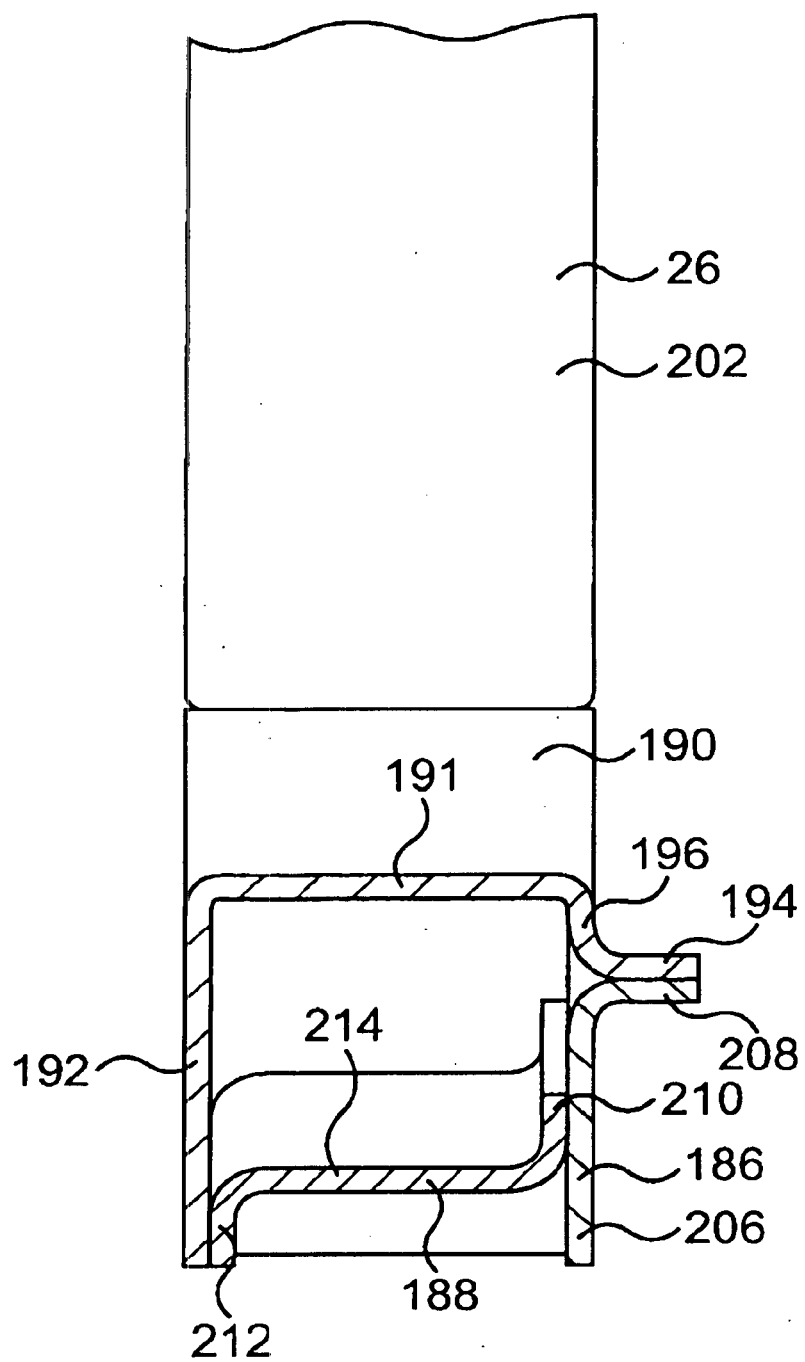
FIG. 10 shows a cross sectional view of a portion of the rearward ring assembly taken through the line 10—10 of FIG. 7.

The intermediate cross element 186 is preferably an essentially L-shaped structure (in cross section as best seen in FIG. 10) of stamped sheet metal construction that includes an essentially vertically extending rearward wall portion 206 and a forwardly and essentially horizontally extending wall portion 208. The lower cross element 188 is preferably of stamped sheet metal construction and includes essentially vertically extending forward and rearward wall portions 210, 212, respectively, and a central wall portion 214 extending integrally therebetween. The details of the construction of the intermediate and lower cross elements 186, 188 can best be understood after examining the construction of the preferred embodiment of the rearward connecting or cross structure 14, which preferred embodiment is provided by the tubular hydroformed connecting member 104.

The assembled rearward ring assembly 20 is shown mounted to the hydroformed connecting member 104 in isolation in FIG. 5 to illustrate the manner in which the cross structure assembly 38 of the rearward ring assembly 20 is connected to the tubular hydroformed connecting member 104. The rearward ring assembly 20 defines an opening 220 into the interior region 40 of the space frame 10, 250. As best seen in FIG. 5, the tubular connecting member 104 is mounted to the rearward ring assembly 20 at a position generally below the opening 220. The tubular connecting member 104 has straight, horizontally extending terminal end portions 222, a straight, horizontally extending central portion 224, and angled transition portions 223 each extending tubularly integrally between each terminal end portion 222 and an adjacent end of the central portion 224. The central portion 224 has a length approximately equal to the width of the lowermost portion of the rearward opening 220 and the cross structure assembly 38 is connected to the tubular connecting member 104 such that the central portion 224 thereof is spaced vertically downwardly from the rearward opening 220.

Returning again to a consideration of the structure of the intermediate and lower cross elements 186, 188 as best shown in FIG. 9, it can be appreciated that end portions of the wall portion 206 of the intermediate cross element 186 are tapered at 228 and opposite end portions of the central wall portion 214 of the lower cross element 188 are angled upwardly at 230 so that the cross structure assembly 38 of the assembled rearward ring assembly 20 is shaped to receive the hydroformed tubular connecting member 104 and thereby facilitate welded engagement between the connecting structure assembly 38 and the hydroformed member 104.

The manner in which the cross elements 182, 184, 186, 188 are assembled to form the cross structure assembly 38 can best be appreciated from the cross sectional view of FIG. 10. The rearward wall portion 212 of the lower cross element 188 is secured to the rearward wall portion 192 of the upper cross element 182 and the forward wall portion 210 of the lower cross element 188 is secured to the wall portion 206 of the intermediate cross element 186. The forwardly projecting wall portion 208 of the intermediate cross element 186 is secured to the forwardly projecting wall portion 194 of the upper cross element 182. Preferably, the cross elements 182, 184, 186 and 188 are secured together by welding, although any suitable means of securing metallic members together can be used in the construction, including the use of any adhesive material. It can be understood from FIG. 10 that the cross elements 182, 184, 186, 188 are constructed and arranged to provide the cross structure assembly 38 with a tubular structure. Because this tubular structure has a closed cross section (i.e., a closed transfers cross section as shown in FIG. 10), the cross structure assembly 38 better resists deformation upon impact during a collision.

It can be appreciated from FIG. 5 that the terminal end portions 222 of the hydroformed connecting member 104 project outwardly from respective opposite sides of the rearward ring assembly 20 when the ring assembly 20 is connected to the connecting member 104. The terminal end portions 222 of the hydroformed member 104 are preferably of reduced diameter (see FIG. 5) to facilitate formation of joints between the rearward side rail members 76, 78 and respective terminal end portions 222 of the connecting member 104. It can be understood from FIGS. 1 and 5, for example, that preferably the length of each terminal end portion 222 is approximately equal to the width of the associated rearward side rail member 76, 78 and that the exterior surface of the terminal end portions 222 defines a shape that is complementary to the shape of the openings 103 formed within the side rail members 76, 78. The terminal end portions 222 are welded in the pair of openings 103.

As will become clear (and as can be appreciated from FIGS. 4 and 8, for example), the rearward ring assembly 20 is constructed and arranged such that the rearward-most pillars are curved forwardly along an intermediate portion thereof as viewed in side elevation. More particularly, the side members 24, 26 have lower portions 202 thereof disposed closer to one another than upper portions 225 thereof (as viewed in rear elevation as in FIG. 7) and the side members have lower portions 202 thereof disposed more rearwardly in a longitudinal frame direction in relation to upper portions 225 thereof (as seen from the point of view of the side elevational view of FIG. 4, for example). Preferably each side member 24, 26 is secured to a respective side rail structure and to a respective end of the connecting member 104 by welding or other suitable method of suitable strength.

The shape of the assembled rearward ring assembly 20 can be best appreciated from FIGS. 4–8. FIGS. 4 and 8 show side elevational views of the rearward ring assembly 20 and FIG. 7 shows a rear elevational view of the ring assembly 20. As best seen in the rear elevational view of FIG. 7, each of the leg portions 34, 36 of the hydroformed U-shaped assembly 32 is preferably of mirror image construction (so the discussion will focus on leg portion 34, but applies equally to leg portion 36) and each defines a rearward-most pillar 34, 36 of the frame 12. Each rearward-most pillar 34 has an essentially straight upper end portion 234 extending downwardly from an associated juncture 31, an essentially straight lower end portion 236 and an inwardly angled central portion 238 so that the straight upper end portions 234 of the leg portions 34, 36 cooperate to define a relatively wide upper portion of the rearward opening 220 and the straight lower end portions 236 define a relatively narrow lower portion of the rearward opening 220 as viewed in rear elevation (i.e., the view of FIG. 7). It can be understood that a rear door (not shown) that is constructed and arranged for door opening and closing movement with respect to the rear opening 220 would have a corresponding relatively wide upper portion and a relatively narrow lower portion so that the shape of the door matches the shape of the opening 220. It can be appreciated that it is contemplated to mount a glass panel the upper, relatively wide upper portion of the rear door to provide a rear windshield for a vehicle assembled using the space frame 10, 250. The relatively wide upper portion of the ring assembly 20 is constructed to allow the rear windshield of the vehicle to be relatively wide, thereby improving driver visibility, particularly when the driver looks out his or her central rear view mirror and outwardly generally through the opening 220.

Preferably each essentially straight upper end portion 234 of the U-shaped assembly tapers outwardly from top to bottom and each essentially straight lower end portion 236 of the U-shaped assembly 32 tapers outwardly from top to bottom as viewed in rear elevation. Preferably, each rearward-most pillar 34, 36 has an essentially straight upper end portion 240 and an essentially straight lower end portion 242 as viewed in side elevation (see, for example, FIG. 8).

As mentioned (and as can be appreciated from FIGS. 4 and 8), the rearward ring assembly 20 is constructed and arranged such that the rearward-most pillars 34, 36 are curved forwardly along an intermediate portion 243 thereof as viewed in side elevation. It can be appreciated that this curvature of the rearward-most pillars 34, 36 improves the aerodynamics of the vehicle and also accommodates a glass rear windshield panel mounted in an upper portion of the rear door to have a similar curvature. This curvature of a rear windshield panel offers improved dispersion of reflected bright sunlight, thereby improving the visibility for the driver of the vehicle and for drivers of vehicles behind the vehicle constructed using the space frame 10, 250. As best appreciated from the side elevational view of the space frame 250 of FIG. 4, preferably the essentially straight lower end portion 242 of each rearward-most pillar 34, 36 is vertical (when the side rail structures 12 are resting on a horizontal surface) and the essentially straight upper end portion 240 forms an angle of approximately 10 (ten) degrees with respect to the essentially straight lower end portion 240 as viewed in side elevation. It is contemplated to provide embodiments of the rearward ring assembly in which the angle between the end portions 240, 242 of the rearward-most pillars 34, 36 are within a range from approximately 5 (five) to approximately 15 (fifteen) degrees.

It can be appreciated from FIG. 7 that each of the legs 30 of the hydroformed upper member 22 is essentially straight and that each of the side members 24, 26 has an essentially straight upper portion 225, an essentially straight lower end portion 202 and an inwardly angled central portion 238 as viewed in rear elevation. Thus, it can be understood that the straight portions 30 and 225 of the upper member 22 and side member 24, respectively, cooperate to provide the straight upper portion 234 of the associated rearward-most pillar 34 of the U-shaped assembly 32 and that the lower portion 202 of the side member 24 comprises the lower portion 236 of the associated pillar 34 of the U-shaped assembly 32. Similarly the inwardly angled intermediate portion 238 of the side member 24 is identical to (and therefore comprises) the inwardly angled intermediate portion of the pillar 34 of the U-shaped assembly 32.

Typically, a rear hatchback-type door (not shown) is mounted on the space frame 10, 250 for door opening and closing movement with respect to the opening 220 defined by the rearward ring assembly 20. For example, a rear door may be pivotally mounted to the cross portion 28 of the U-shaped assembly 32 by a pair of hinges (not shown). Often a continuous door seal is mounted around a peripheral portion of the rear door. It can be understood that it is important that the doorway defined by the rearward opening 220 have a smooth, continuous door seal engaging surface around its periphery that is constructed and arranged to abuttingly and sealingly engage the door seal of the closed rear door and to facilitate movement of the door seal inwardly and outwardly of the opening 220 when the door is opened and closed.

As best seen in FIGS. 5, 6 and 7, the upwardly facing surfaces 190 of the upper cross elements 182, 184 each curve arcuately upwardly at the outermost ends thereof. The upwardly facing surfaces 190 of elements 182, 184 are flush with one another at the juncture 239 therebetween. The innermost ends of the upper cross elements 182, 184 are preferably secured together by welding to form the juncture 239. The inwardly facing side surfaces 249 of the side members 24, 26 of the tubular hydroformed inverted generally U-shaped assembly 32 and the upwardly facing surfaces 190 of the cross elements 182, 184 cooperate to form a continuous, smooth door sealed engaging surface around the lower portion of the opening 220. It can also be appreciated from FIG. 7 that the side members 24, 26 and the upper member 22 provided a smooth, continuous door sealed engaging surface around the upper portion of the opening 220. Thus, the door opening has a continuous, smooth door seal engaging surface 260 around its entire periphery.

It can also be appreciated from FIG. 7 that the uppermost downwardly facing portion of the door sealed engaging surface 260 that is defined by the hydroformed upper member 22 is angled slightly rearwardly and outwardly of the opening 220 to accommodate the arcuate movement of a pivotally mounted rear vehicle door mounted to the rearward ring assembly 20 by a pair of laterally spaced hinges secured to the cross portion 28 of the upper member 22.

Hydroforming Method

Figure 11:
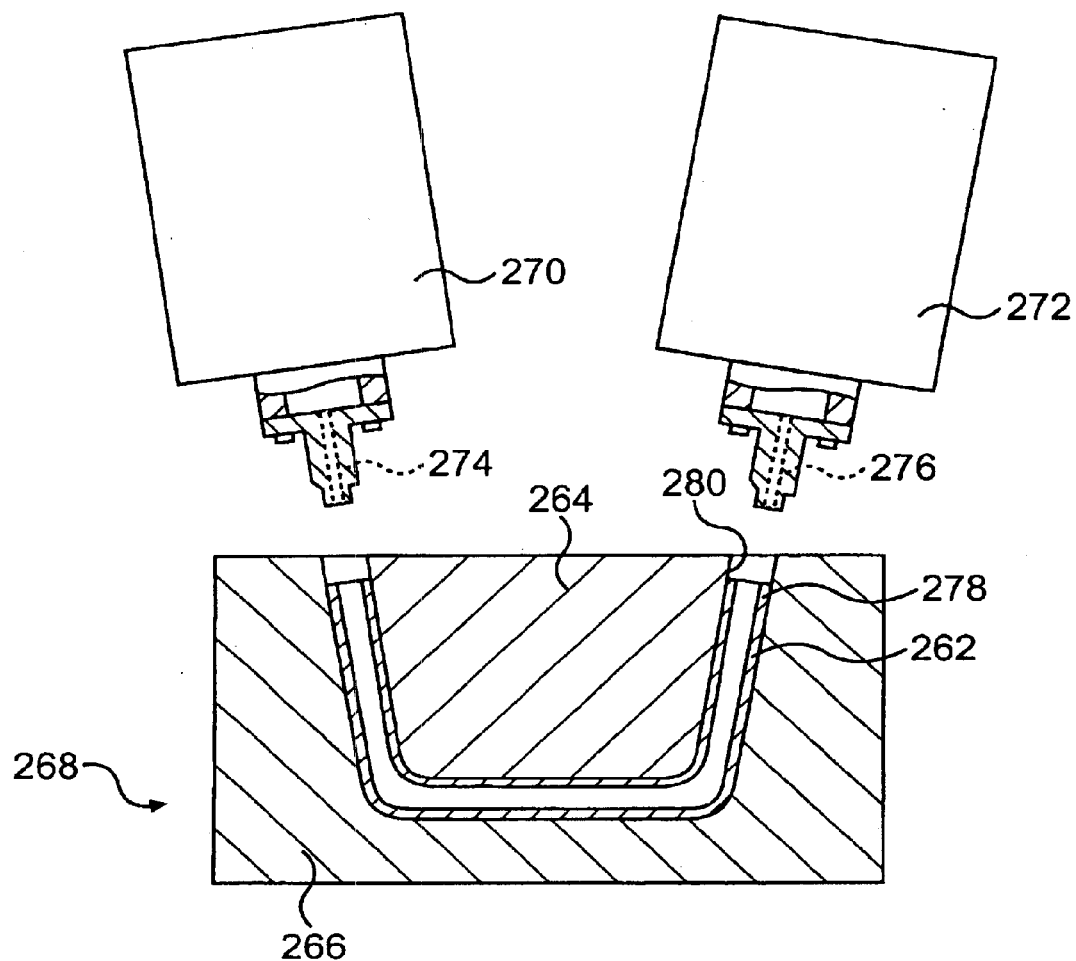
FIG. 11 is a schematic cross sectional view of an exemplary hydroforming assembly.

The preferred hydroforming process for forming each hydroformed member of the exemplary space frame 10 can be understood from FIG. 11. Each hydroformed member is formed from a tubular blank 262 constructed of a first metallic material. The blank 262 has a closed transverse cross section, open tubular ends and a predetermined length If the geometry of the part is complex or if there are to be any sharp bends (a bend of greater than 30 degrees) in the finished member, the blank 262 may optionally be bent prior to hydroforming. Preferably the blank is bent according to the teachings of Ser. No. 09/299,595, filed Oct. 7, 1997, entitled METHOD AND APPARATUS FOR WRINKLE-FREE HYDROFORMING OF ANGLED TUBULAR PARTS, hereby incorporated by reference in its entirety.

It should be understood that the methodology of Ser. No. 60/061,238 would preferably not be used for parts that are bent at an angle of less than 30 degrees. Preferably, straight parts are hydroformed in accordance with the teachings of Ser. No. 08/915,910, filed Aug. 21, 1997, entitled Hydroforming Die Assembly For Pinch-Free Tube Forming, hereby incorporated by reference in its entirety. A blank may also be bent in a CNC bending machine prior to being placed in the die assembly. A suitable lubricant may be applied to the exterior of the blank prior to placing it in the die assembly.

The blank 262 is then placed between the die halves 264, 266 of a die assembly 268 and the assembly is closed. The die assembly 268 can be a single cavity or multicavity tool, depending on the configuration of the hydroformed member to be produced. The blank 262 is filled with hydroforming fluid and a hydroforming ram assembly 270, 272 engages each end of the blank 262. Typically, the hydroforming process uses an internal high pressure flow of water to form the tubular blank. A ram member 274, 276 of each assembly 270, 272 seals a respective end of the blank 262. The ram members 274, 276 include hydraulic intensifiers which can intensify the hydroforming fluid, thereby increasing the fluid pressure within the blank 262 to outwardly deformed tubular metallic wall, generally designated 278, of the tubular blank 262 into conformity with the die surfaces 280 of the die cavity (as disclosed in Ser. No. 60/061,238) to thereby form a hydroformed member having an exterior surface that is fixed into a predetermined configuration. This predetermined exterior surface configuration is regular (i.e., uniform) or irregular (i.e., nonuniform) depending on the shape of the die cavity.

The fluid pressure and the axial pressure are independently controllable. The ram members 274, 276 push axially inwardly on opposite ends of the blank 262 to create metal flow within the blank during outward expansion. Preferably, the ends of the tubular blank 262 are pushed axially inwardly during the hydroforming operation to maintain the wall thickness of the fully formed hydroformed member within a predetermined range of the wall thickness of the initial tubular blank 262. This process is discussed in detail in the aforesaid Application Ser. No. 60/061,238. Preferably the ram members 274, 276 cooperate to replenish or maintain the wall thickness of the outwardly expanding wall portions of the blank 262 so that the wall thickness of the resulting hydroformed member is within about +/−10% of the original wall thickness of the blank 262 (i.e., to compensate for wall thinning during diametric outward expansion of the tube).

It can be appreciated that this metal flow requires portions of the outer surface of the tubular blank 262 to slide in an axial direction with respect to the die cavity surface. The longer the length of the tubular blank and the more complex the geometry of the hydroformed member (generally defined by the surfaces of the die cavity), the more difficult it becomes to achieve optimal metal flow during formation of the hydroformed member. It can be understood therefore that because of the length and the complex geometry of the inverted U-shaped hydroformed assembly 32 (described above and illustrated in several of the figures, particularly FIGS. 4 through 9), it is preferred to form the U-shaped member 32 by connecting a tubular hydroformed upper member 22 and a pair of tubular hydroformed side members 24, 26 in the manner described above and illustrated in the figures.

The tubular blank 262 expands into conformity with the surfaces 280 defining the hydroforming die cavity so as to outwardly expand the metallic wall 278 of the blank 262 (irregularly or regularly) into conformity with the surfaces 262 of the die assembly 268 to provide the metallic wall 278 with a shape corresponding to the desired shape for the member. The shape of each die cavity used to form each hydroformed member of the space frame 10, 250 in accordance with the present invention is particularly adapted to the shape of the new and advantageous hydroformed tubular members contemplated herein.

It can be appreciated that the transverse cross section of many of the hydroformed members of the space frame 10, 250 varies along the length of a particular hydroformed member. It can be understood that altering the cross-sectional configuration of any of the tubular hydroformed members shown and/or described herein can be accomplished without departing from the principles of the present invention. The cross sections of the members can be regular (i.e., uniform) or irregular (i.e., nonuniform).

The description and the illustrations of the space frames 10, 250, the rearward ring assembly 20 and the cradle assembly 152 are intended to teach and illustrate the principles of the invention and are not intended to limit the scope of the invention to the embodiments shown. Thus, while the invention has been disclosed and described with reference to a limited number of embodiments, it will be apparent that variations and modifications may be made thereto without departing from the spirit and scope of the invention. Therefore, the following claims are intended to cover all such modifications, variations, and equivalents thereof in accordance with the principles and advantages noted herein.

What is claimed is:

1. A space frame for a motor vehicle, said space frame comprising:

a pair of laterally spaced, longitudinally extending side rail structures;

a pair of forward-most upright structures each being connected to a respective side rail structure, thereby forming a pair of A pillars;

a pair of roof rail structures, a forward end of each roof rail structure being connected to an upper end of an associated A pillar; and a rearward ring assembly connected at upper portions thereof with said roof rail structures and at bottom portions thereof with said rail structures, said rearward ring assembly comprising (a) a tubular hydroformed inverted U-shaped upper member, said upper member having a cross portion and a pair of leg portions extending downwardly from opposite ends of said cross portion, (b) a pair of tubular hydroformed side members, said side members each having first and second ends, each said side member being connected at said first end thererof with a free end of a respective leg portion of said upper member, and (c) cross structure rigidly connected in ring-forming relation between said second ends of the side members, said side rail structures, said A pillars, said roof rail structures and said rearward ring assembly generally defining a space frame interior region, said rearward ring assembly providing a rearward opening into said interior region, and said side members having lower portions thereof disposed closer to one another than upper portions thereof, said side members having lower portions thereof disposed more rearwardly in a longitudinal frame direction in relation to upper portions thereof, wherein said inverted hydroformed U-shaped upper member and said hydroformed side members together form an inverted U-shaped assembly, said inverted U-shaped assembly defining a pair of rearward-most pillars, each said rearward-most pillar having an essentially straight upper end portion extending downwardly from an associated juncture with said cross portion, an essentially straight lower end portion, and an inwardly angled central portion so that said straight upper end portions define a relatively wide upper portion of said rearward opening and said straight lower end portions define a relatively narrow lower portion of said rearward opening, further including a laterally extending rearward connecting structure connected between rearward portions of said side rail structures and wherein said cross structure of said rearward ring assembly is connected to said rearward connecting structure such that said cross structure extends laterally between said side rail structures, said lower end portion of each said rearward-most pillar being connected to said rearward first connecting structure and extending generally upwardly with respect thereof.

2. A space frame as defined in claim 1, wherein said essentially straight upper end portions of said rearward-most pillars taper rearwardly and said essentially straight lower end portions of said rearward-most pillars taper rearwardly from top to bottom.

3. A space frame as define in claim 2, wherein the essentially straight lower end portion of each said rearward-most pillar is vertical and the essentially straight upper end portion forms an angle of approximately 10 degrees therewith as viewed in side elevation.

4. A space frame for a motor vehicle, said space frame comprising:

a pair of laterally spaced, longitudinally extending side rail structures;

a pair of forward-most upright structures each being connected to a respective side rail structure, thereby forming a pair of A pillars;

a pair of roof rail structures, a forward end of each roof rail structure being connected to an upper end of an associated A pillar; and a rearward ring assembly connected at upper portions thereof with said roof rail structures and at bottom portions thereof with said side rail structures, said rearward ring assembly comprising (a) a tubular hydroformed inverted U-shaped upper member, said upper member having a cross portion and a pair of leg portions extending downwardly from opposite ends of said cross portion, (b) a pair of tubular hydroformed side members, said side members each having first and second ends, each said side member being connected at said first end thereof with a free end of a respective leg portion of said upper member, and (c) cross structure rigidly connected in ring-forming relation between said second ends of the side members, said side rail structures, said A pillars, said roof rail structures and rearward ring assembly generally defining a space frame interior region, said rearward ring assembly providing a rearward opening into said interior region, and said side members having lower portions thereof disposed closer to one another than upper portions thereof, said members having lower portions thereof disposed more rearwardly in a longitudinal frame direction in relation to upper portions thereof, wherein said cross structure forms a hollow, tubular element extending between said second ends of said side members.

5. A space frame as defined in claim 4, wherein said inverted hydroformed U-shaped upper member and said hydroformed side members together form an inverted U-shaped assembly, said inverted U-shaped assembly defining a pair of rearward-most pillars, each said rearward-most pillar having an essentially straight upper end portion extending downwardly from an associated juncture with said cross portion, an essentially straight lower end portion, and an inwardly angled central portion so that said straight upper end portions define a relatively wide upper portion of said rearward opening and said straight lower end portions define a relatively narrow lower portion of said rearward opening.

6. A space frame according to claim 4, wherein said cross structure comprised an assembly of stamped members assembled into a tubular configuration.

7. A space frame for a motor vehicle, said space frame comprising:

a pair of laterally spaced, longitudinally extending side rail structures;

a pair of forward-most upright structures each being connected to a respective side rail structure, thereby forming a pair of A pillars;

a pair of roof rail structures, a forward end of each roof rail structure being connected to an upper end of an associated A pillar; and a rearward ring assembly connected at upper portions thereof with said roof rail structures and at bottom portions thereof with said side rail structures, said rearward ring assembly comprising (a) a tubular hydroformed inverted U-shaped upper member, said upper member having a cross portion and a pair of leg portions extending downwardly from opposite ends of said cross portion, (b) a pair of tubular hydroformed side members, said side members each having first and second ends, each said side member being connected at said first end thereof with a free end of a respective leg portion of said upper member, and (c) cross structure rigidly connected in ring-forming relation between said second ends of the side members, said side rail structures, said A pillars, said roof rail structures and said rearward ring assembly generally defining a space frame interior region, said rearward ring assembly providing a rearward opening into said interior region, and said side members having lower portions thereof disposed closer to one another than upper portions thereof, said side members having lower portions thereof disposed more rearwardly in a longitudinal frame direction in relation to upper portions thereof, further including a front structural assembly, said front structural assembly comprising a pair of front upper side rail structures, a front cross structural assembly and a pair of side support structures, said front cross structural assembly being connected laterally between forward end portions of said side rail structures, each said front upper side rail structure being connected between said front cross structural assembly and an intermediate portion of a respective A pillar so that said front upper side rail structures are laterally space from one another and generally vertically space above forward portions of said side rail structures, each side support structure being connected at one end to an intermediate portion of a respective A pillar and extending forwardly and downwardly therefrom and being connected at another end opposite said one end to an associated side rail structure.

8. A space frame as defined in claim 7, wherein said pair of front upper side rail structures are provided by a pair of tubular hydroformed front upper side rail members and wherein said pair of side support structures are provided by a pair of tubular hydroformed front upper side rail members.

9. A space frame as defined in claim 8, wherein said roof rail structures are tubular hydroformed members.

10. A space frame for a motor vehicle, comprising:

a pair of side rail structures, said side rail structures each having an upwardly arched portion defining a pair of wheel wells;

first and second connecting structures connected laterally between said side rail structures rearwardly and forwardly, respectively, of said wheel wells; and a cradle assembly comprising a pair of elongated cradle support structures and a pair of U-shaped cradle structures, each U-shaped cradle structure having a pair of leg portions extending from a cross portion, said cradle support structures being laterally spaced and each being connected between said first and second connecting structures, said U-shaped cradle structures being longitudinally spaced and each leg portion of said pair of leg portions of each said U-shaped cradle structure being connected to a respective one of said pair of cradle support structures.

11. A space frame as defined in claim 10, wherein each said cradle support structure is provided by a tubular hydroformed cradle support member, each said cradle support member being defined by an outwardly deformed metallic wall fixed into a predetermined surface configuration, and wherein each said U-shaped cradle structure is provided by a tubular hydroformed U-shaped cradle member, each said U-shaped cradle member being defined by an outwardly deformed metallic wall fixed into a predetermined surface configuration.

12. A space frame as defined in claim 11, wherein said pair of corresponding wheel wells define a pair of rear wheel wells.

13. A method of forming a space frame for a motor vehicle, comprising:

providing components for a space frame including a pair of side rail structures, each side rail structure including a wheel well-forming portion, a pair of connecting structures, and a cradle assembly, said cradle assembly including a pair of elongated cradle support members and a pair of U-shaped cradle members, each U-shaped cradle member having a pair of leg portions extending from a cross portion, the cradle support members and the U-shaped cradle members each being formed in a hydroforming procedure that includes providing a tubular blank having a metallic wall, placing the blank in a die assembly having die surfaces defining a die cavity and providing pressurized fluid in an interior of the blank to expand said wall into conformity with said die surfaces, and assembling said components such that the first and second connecting structures are connected laterally between said side rail structures rearwardly and forwardly, respectively, of said wheel well-forming portions, said cradle support members are laterally spaced and are each connected between the first and second connecting structures, and said U-shaped cradle structures are longitudinally spaced and each leg portion of said pair of leg portions of each U-shaped cradle member is connected to a respective one of said pair of cradle support members.

14. A method of forming a space frame for a motor vehicle, comprising:

providing components for a space frame including a pair of side rail structures, a pair of roof rail structures, pair of forward-most and rearward-most upright structure, and a front structural assembly, said front structural assembly including a pair of forward upper rail members, a front cross structural assembly and a pair of side support members, each said member being formed in a hydroforming procedure, each procedure including providing a tubular blank having a metallic wall, placing the blank into a die assembly having die surfaces defining a die cavity, and providing pressurized fluid into an interior of the blank to expand the wall into conformity with the die surfaces; and assembling said components so that forward-most upright structure is connected to a respective side rail structure so as to define an A pillar thereon, each rearward-most upright structure is connected to a respective side rail structure so as to define a D pillar thereon, each roof rail structure is connected between an upper end of a respective A pillar and an upper end of an associated D pillar, said front cross structural assembly is connected laterally between forward end portions of said side rail structures, each front upper side rail member is connected between said front cross structural assembly and an intermediate portion of a respective a pillar so that said front upper side rail members are laterally spaced from one another and are each generally vertically spaced above the forward portion of an associated side rail structure, and each side support member is connected at one end to an intermediate portion of a respective A pillar and extends forwardly and downwardly therefrom and is connected at another end opposite said one end to an associated side rail structure.

15. A method for forming a rearward ring frame assembly for a motor vehicle, comprising:

bending a tubular blank into a generally U-shaped configuration; hydroforming said U-shaped blank to form a hydroformed inverted U-shaped frame member by applying pressurized fluid internally to said U-shaped blank so as to expand said U-shaped blank into conformity with die surfaces of a hydroforming die;

providing a pair of side member blanks;

hydroforming each of said side members blanks to form a pair of frame side members by applying pressurized fluid internally thereto so as to expand said side member blank into conformity with die surfaces of a hydroforming die;

connecting a first end of each said hydroformed frame side members to associated leg portions of said hydroformed inverted U-shaped frame member;

providing a cross structure; and connecting said cross structure between second ends of said hydroformed frame side members, wherein the providing a cross structure includes forming a cross structure as a hollow, tubular element.

16. A space frame for a motor vehicle, said space frame comprising:

a pair of laterally spaced, longitudinally extending side rail structures;

a pair of forward-most upright structures each being connected to a respective side rail structure, thereby forming a pair of A pillars;

a pair of roof rail structures, a forward end of each roof rail structure being connected to an upper end of an associated A pillar; and a rearward ring assembly connected at upper portions thereof with said roof rail structures and at bottom portions thereof with said side rail structures, said rearwarding ring assembly comprising (a) a tubular hydroformed inverted U-shaped upper member, said upper member having a cross portion and a pair of leg portions extending downwardly from opposite ends of said cross portion, (b) a pair of tubular hydroformed side members, said side members each having first and second ends, each said side member being connected at said first end thereof with a free end of a respective leg portion of said upper member, and (e) cross structure rigidly connected in ring-forming relation between said second ends of the side members, said side rail structures, said A pillars, said roof rail structures and said rearwarding ring assembly generally defining a space frame interior region, said rearward ring assembly providing a rearward opening into said interior region, and said side members having lower portions thereof disposed closer to one another than upper portions thereof, said side members having lower portions thereof disposed more rearwardly in a longitudinal frame direction in relation to upper portions thereof, wherein said rearward ring assembly is rigidly and permanently connected at upper portions thereof with said rail structures, also said rearward ring assembly is rigidly and permanently connected at bottom portions thereof with said side rail structures.

* * * * *

UNITED STATES PATENT AND TRADEMARK OFFICE
CERTIFICATE OF CORRECTION

PATENT NO. : 6,926,350 B2  Page 1 of 1
APPLICATION NO. : 10/416549
DATED : August 9, 2005
INVENTOR(S) : Gianfranco Gabbianelli It is certified that error appears in the above-identified patent and that said Letters Patent is hereby corrected as shown below:

On title page, item 73 Assignee
replace "Cosma International Inc."
with --Magna International Inc.--.

Signed and Sealed this

Seventh Day of August, 2007

JON W. DUDAS
*Director of the United States Patent and Trademark Office*